US008153715B2

(12) United States Patent
Stark

(10) Patent No.: US 8,153,715 B2
(45) Date of Patent: Apr. 10, 2012

(54) AMINOFUNCTIONAL POLYVINYLACETALS

(75) Inventor: Kurt Stark, Weilersbach (DE)

(73) Assignee: Kuraray Europe GmbH, Frankfurt am Main (DE)

( * ) Notice: Subject to any disclaimer, the term of this patent is extended or adjusted under 35 U.S.C. 154(b) by 1061 days.

(21) Appl. No.: 11/569,439

(22) PCT Filed: May 18, 2005

(86) PCT No.: PCT/EP2005/005412
§ 371 (c)(1),
(2), (4) Date: Nov. 21, 2006

(87) PCT Pub. No.: WO2005/118653
PCT Pub. Date: Dec. 15, 2005

(65) Prior Publication Data
US 2009/0203829 A1      Aug. 13, 2009

(30) Foreign Application Priority Data
Jun. 1, 2004   (DE) .......................... 10 2004 026 609

(51) Int. Cl.
*C08K 5/10*         (2006.01)
(52) U.S. Cl. ........ 524/315; 523/160; 523/161; 524/379; 525/56; 525/61
(58) Field of Classification Search .................. 524/315, 524/379, 503, 557; 525/56, 61; 523/160, 523/161
See application file for complete search history.

(56) References Cited

U.S. PATENT DOCUMENTS

| 273,905 A | 3/1956 | Priest et al. |
| 2,739,059 A * | 3/1956 | Priest et al. .................. 430/627 |
| 2,890,927 A * | 6/1959 | Suyama et al. ............... 264/205 |
| 2,960,384 A | 11/1960 | Osugi et al. |
| 3,457,327 A * | 7/1969 | Noda et al. ....................... 525/58 |
| 5,380,403 A * | 1/1995 | Robeson et al. .............. 162/147 |
| 5,985,996 A * | 11/1999 | Baumann et al. ............... 525/59 |
| 6,485,609 B1 * | 11/2002 | Boylan ......................... 162/135 |
| 2003/0040575 A1 | 2/2003 | Stark et al. |

FOREIGN PATENT DOCUMENTS

| EP | 0461399 A2 | 12/1991 |
| EP | 0552702 A1 | 7/1993 |
| EP | 0617166 A1 | 9/1994 |
| EP | 1284274 A1 | 2/2003 |
| FR | 1145722 | 5/1957 |
| GB | 834612 | 5/1960 |
| WO | WO98/13394 | 4/1998 |
| WO | WO02/072361 A1 | 9/2002 |

OTHER PUBLICATIONS

English Patbase Abstract corresponding to EP-A 1284274, Feb. 19, 2003.
English Patbase Abstract corresponding to FR 1145722, Oct. 29, 1957.

* cited by examiner

*Primary Examiner* — David W Wu
*Assistant Examiner* — Marie Reddick
(74) *Attorney, Agent, or Firm* — Brooks Kushman P.C.

(57) ABSTRACT

Polyvinyl acetals which contain acetal moieties derived by acetalizing polyvinyl alcohol with both aliphatic aldehydes or their derivatives and with amino- and/or ammonium-substituted aldehydes display exceptional substrate adhesion when used in printing ink as binders, allowing inks without adhesion promoters to be produced.

18 Claims, No Drawings

# AMINOFUNCTIONAL POLYVINYLACETALS

CROSS-REFERENCE TO RELATED APPLICATION

This application is the U.S. national phase of PCT Appln. No. PCT/EP2005/005412 filed May 18, 2005, which claims priority to German application 10 2004 026 609.3 filed Jun. 1, 2004.

BACKGROUND OF THE INVENTION

1. Field of the Invention

The invention relates to amino-functional polyvinyl acetals, to processes for preparing them, and in particular, to their use in printing ink compositions.

2. Description of the Related Art

The preparation of polyvinyl acetals, which are obtained from the corresponding polyvinyl alcohols by polymer-analogous reaction with the corresponding aldehydes, has been known as early as 1924. Since then, a multiplicity of aldehydes have been used to prepare the corresponding polyvinyl acetals. Polyvinyl acetals are prepared in a three-stage process: polyvinyl acetate→polyvinyl alcohol→polyvinyl acetal, giving products which in addition to vinyl acetal groups, also include vinyl alcohol and vinyl acetate units. Commercial significance has been acquired in particular by polyvinyl formal, polyvinyl acetal and polyvinyl butyral (PVB).

The greatest area of application for polyvinyl acetals is in the production of safety glass in carmaking and in architecture, with plasticized polyvinyl butyral films being used as an interlayer in glass sheets. A further field of use for polyvinyl butyrals is in anti-corrosion coatings. Their good pigment-binding power is one of the reasons why polyvinyl butyrals are also used as binders in coating materials and especially in printing inks. In this application it is required that the organic solutions of the polyvinyl butyrals should have a very low solution viscosity, in order to allow the preparation of inks combining a high solids content with a very high binder fraction. Examples thereof are the modified polyvinyl butyrals with low solution viscosity from DE-A 19641064, which are obtained by acetalizing a copolymer having vinyl alcohol and 1-alkyl-vinyl alcohol units.

A disadvantage shared by all of the prior art polyvinyl acetals is their inadequate adhesion to specific substrates. Because of this it is mandatory in many cases to add adhesion promoters. EP-B 0346768 describes the coating of films or sheets with amino-functional silanes, such as N-(2-aminoethyl)-3-aminopropyltrimethoxysilane, in order to improve their bonding with other polymers, especially with polyvinyl butyrals.

The prior art methods of improving adhesion between polyvinyl acetals and critical substrates by adding the known adhesion promoters have distinct disadvantages. For example, the adhesion promotion effect is often not maintained for a sufficient period, or the bond becomes weaker with time. Another problem is the addition of adhesion promoters themselves. It always entails an additional, time-consuming step during formulation. Moreover, the selection and addition of suitable adhesion promoters requires a great deal of know-how, since the addition of the adhesion promoter to a polyvinyl acetal—in an organic solvent, for example—may be accompanied by instances of incompatibility and inhomogeneity, possibly going as far as phase separation. Furthermore, side-reactions of the reactive silanes that are subsequently added as adhesion promoters cannot be ruled out (hydrolysis reactions, condensation reactions). A further disadvantage is the large amount of adhesion promoter that must usually be added in order to obtain a distinctly improved adhesion of polyvinyl acetals to critical substrates, and so this method, in view of the high price of silanes, can become very expensive.

EP-A 617166 A1 relates to the use of amino-functional polyvinyl alcohol for improving the properties of recycled paper. An alternative to the preparation is specified as being the reaction of polyvinyl alcohol with amino aldehyde dialkyl acetal. Besides the vinyl alcohol units, the only vinyl acetal units the product contains are amino acetal groups. A product of this kind is also known from WO 02/072361 A1, which describes amino-functional polyvinyl alcohols as binders for inkjet paper. EP 552702 A1 describes the use of vinylamine-vinyl alcohol copolymers, which where appropriate may have been acetalized, in papermaking. In the products specified therein the amine group is linked directly to the polymer chain. Products of the same kind, i.e. vinylamine-vinyl alcohol copolymers, which where appropriate additionally carry ester, amide and/or acetal groups, are described in EP 461399 A2.

SUMMARY OF THE INVENTION

An object of the invention was therefore to provide polyvinyl butyrals which by themselves possess very good adhesion to a variety of substrates, and particularly to the known critical substrates, so that ideally, the addition of adhesion promoters can be dispensed with entirely. It has been surprisingly found that polyvinyl acetals which are obtained from polyvinyl alcohols by polymer-analogous reaction with aldehydes, where at least one aldehyde, which may also be in hydrate, acetal or hemiacetal form, contains amino or ammonium groups, possess a markedly improved adhesion to critical substrates, even to the point where adhesion promoters can be dispensed with. Moreover, the adhesion to glass or metals is also greatly improved. The adhesion improvement effect comes about in the modified polyvinyl acetals even with a very low amino and/or ammonium group content.

DETAILED DESCRIPTION OF THE PREFERRED EMBODIMENTS

The invention provides polyvinyl acetals modified with amino or ammonium groups obtainable by acetalizing fully or partly hydrolyzed vinyl ester polymers containing $\geq 50$ mol % of vinyl alcohol units, with one or more aliphatic aldehydes having 1 to 15 carbon atoms, and the acetals and hemiacetals thereof, and with at least one aldehyde containing amino or ammonium groups, or the hydrate, acetal or hemiacetal thereof.

Suitable fully or partly hydrolyzed vinyl ester polymers derive from polymers containing 50 to 100 mol % of vinyl ester units. Suitable vinyl esters are vinyl esters of branched or unbranched carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 to 15 carbon atoms, examples being VeoVa9® or VeoVa10® (trade names of the company Resolutions). Vinyl acetate is particularly preferred.

Besides the vinyl ester units it is possible where appropriate for one or more monomers from the group consisting of methacrylic esters and acrylic esters of alcohols having 1 to 15 carbon atoms, olefins, dienes, vinylaromatics and vinyl halides to have been copolymerized as well. Suitable monomers from the group of the esters of acrylic or methacrylic acid are esters of branched or unbranched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-, iso- and t-butyl acrylate, n-, iso- and t-butyl methacrylate, 2-ethylhexyl acrylate and norbornyl acrylate. Particular preference is given to methyl acrylate, methyl methacrylate, n-, iso- and t-butyl acrylate, 2-ethylhexyl acrylate and norbornyl acrylate. Suitable dienes are 1,3-butadiene and isoprene. Examples of polymerizable olefins are ethene and propene. Vinylaromatics which can be copolymerized include styrene and vinyltoluene. From the group of the vinyl halides it is usual to use vinyl chloride, vinylidene chloride or vinyl fluoride, preferably vinyl chloride. The fraction of these comonomers is such that the fraction of vinyl ester monomer is $\geq 50$ mol % in the vinyl ester polymer.

Where appropriate it is also possible for further comonomers to be present in a fraction of preferably 0.01% to 20% by weight, based on the total weight of the vinyl ester polymer. Examples of such further comonomers are ethylenically unsaturated monocarboxylic and dicarboxylic acids, preferably crotonic acid, acrylic acid, methacrylic acid, fumaric acid and maleic acid; ethylenically unsaturated carboxamides and carbonitriles, preferably N-vinylformamide, acrylamide and acrylonitrile; additionally, cyclic amides which carry an unsaturated group on the nitrogen, such as N-vinylpyrrolidone; mono esters and diesters of fumaric acid and maleic acid, such as the diethyl and diisopropyl esters, and also maleic anhydride; and ethylenically unsaturated sulphonic acids and their salts, preferably vinylsulphonic acid and 2-acrylamido-2-methylpropanesulphonic acid. Further suitable auxiliary monomers include cationic monomers such as diallyldimethylammonium chloride (DADMAC), 3-trimethylammoniopropyl(meth)acrylamide chloride (MAPTAC) and 2-trimethylammonioethyl (meth)acrylate chloride. Further suitable auxiliary monomers include vinyl ethers, vinyl ketones and, further, vinylaromatic compounds, which may also possess heteroatoms.

Suitable auxiliary monomers are also polymerizable silanes and/or mercaptosilanes. Preference is given to γ-acryloyloxy- and/or γ-methacryloyloxy-propyltri(alkoxy)silanes, α-methacryloyloxymethyltri(alkoxy)silanes, γ-methacryloyloxypropylmethyldi(alkoxy)silanes, vinylalkyldi(alkoxy)silanes and vinyltri(alkoxy)silanes, the alkoxy groups that can be used including, for example, methoxy, ethoxy, methoxyethylene, ethoxyethylene, methoxypropylene glycol ether and ethoxypropylene glycol ether radicals. Examples of such monomers are vinyltrimethoxysilane, vinyltriethoxysilane, vinyltripropoxysilane, vinyltriisopropoxysilane, vinyltris(1-methoxy)isopropoxysilane, vinyltributoxysilane, vinyltriacetoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane and 3-(triethoxysilyl)propylsuccinic anhydride-silane. Preference is also given to 3-mercaptopropyltriethoxysilane, 3-mercaptopropyltrimethoxysilane and 3-mercaptopropylmethyldimethoxysilane.

Further examples are functionalized (meth)acrylates, especially epoxy-functional ones such as glycidyl acrylate, glycidyl methacrylate, allyl glycidyl ether and vinyl glycidyl ether, or hydroxyalkyl-functional ones such as hydroxyethyl (meth)acrylate, or substituted or unsubstituted aminoalkyl (meth)acrylates.

Further examples are precrosslinking comonomers such as polyethylenically unsaturated comonomers, examples being divinyl adipate, diallyl maleate, allyl methacrylate, butanediol diacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide and N-methylolallyl carbamate, and alkyl ethers such as the isobutoxy ether or esters of N-methylolacrylamide, of N-methylolmethacrylamide and of N-methylolallyl carbamate.

These vinyl ester polymers are obtainable commercially or can be prepared in a known way by means of polymerization, preferably by bulk polymerization, suspension polymerization or by polymerization in organic solvents, more preferably in alcoholic solution. Examples of suitable solvents and regulators include methanol, ethanol, propanol and isopropanol.

The polymerization is carried out under reflux at a temperature of 40° C. to 100° C. and initiated free-radically by adding customary initiators. Examples of customary initiators are azo initiators, or percarbonates such as cyclohexyl peroxydicarbonate, or peresters such as t-butyl perneodecanoate or t-butyl perpivalate, and peroxides such as t-butyl hydroperoxide. The molecular weight can be adjusted in a known way by adding regulators, by means of the solvent content, by varying the initiator concentration and by varying the temperature. When polymerization is at an end the solvent and, where appropriate, excess monomer and regulator are distilled off.

The vinyl ester polymers are hydrolyzed in a manner known per se, by the belt method or compounder method, for example, in the alkaline or acidic range with the addition of acid or base. Preferably the solid vinyl ester resin is taken up in alcohol, methanol for example, to give a solids content of 10% to 80% by weight. The hydrolysis is preferably carried out in the basic range, by adding NaOH, KOH or NaOCH$_3$, for example. The base is generally used in an amount of 1 to 5 mol % per mole of ester units. The hydrolysis is carried out at temperatures from 25° C. to 80° C. When the hydrolysis is at an end the solvent is distilled off and the polyvinyl alcohol is obtained as a powder. Alternatively the polyvinyl alcohol can be obtained as an aqueous solution by successive addition of water during the distillative removal of the solvent.

Fully hydrolyzed vinyl ester polymers are those polymers whose degree of hydrolysis is $\geq 96$ mol %. Partially hydrolyzed polyvinyl esters are those with a degree of hydrolysis $\geq 50$ mol % and <96 mol %. The fully or partly hydrolyzed vinyl ester polymers preferably have a degree of hydrolysis of 50 mol % to 99.9 mol %, more preferably 70 mol % to 99.9 mol %, most preferably 96 mol % to 99.9 mol %. The viscosity of the polyvinyl alcohol (DIN 53015, Höppler method; 4% strength solution in water) is 1 to 40 mPas, preferably 1 to 6 mPas, and serves as a measure of the molecular weight and of the degree of polymerization of the fully or partly hydrolyzed vinyl ester polymers. The degree of polymerization of the polyvinyl alcohol used is at least 130.

Preferred aldehydes, and also their hydrates, acetals and hemiacetals, containing amino or ammonium groups, can be indicated by the following structural formulae I to IV:

I) $(R)_2N-(CH_2)_n-CH(OR)_2$, an acetal, hemiacetal or aldehyde hydrate of a neutral amino aldehyde;

II) $(R)_2N-(CH_2)_n-CH=O$, a free, neutral amino aldehyde;

III) $X^-(R)_3N^+-(CH_2)_n-CH(OR)_2$, an acetal, hemiacetal or aldehyde hydrate of a cationic ammonium aldehyde;

IV) $X^-(R)_3N^+-(CH_2)_n-CH=O$, a free, cationic ammonium aldehyde;

R in each case being identical or different, being able to have the definition of hydrogen atom and being able to be a branched or unbranched, saturated or unsaturated, unsubstituted or substituted alkyl radical having 1 to 12 carbon atoms and possibly interrupted where appropriate by heteroatoms of the type N, O and/or S. $X^-$ is an anion, where X can be a halogen such as F, Cl, Br or I, or is a radical of an organic or inorganic acid, such as phosphate, hydrogen phosphate, dihydrogen phosphate, phosphite, chlorate, nitrate, nitrite, sulphate, hydrogen sulphate, sulphite, hydrogen sulphite, acetate, carbonate or hydrogen carbonate, for example. n is a number from 0 to 40, preferably from 1 to 10.

Preferred aldehydes or their acetals and/or hemiacetals in accordance with the structural formulae I to IV are formamide, aminoacetaldehyde dimethyl acetal, aminoacetaldehyde diethyl acetal, aminopropionaldehyde dimethyl acetal, aminopropionaldehyde diethyl acetal, aminobutyraldehyde dimethyl acetal, aminobutyraldehyde diethyl acetal, and their cationic ammonium salts.

Particular preference is given to aminoacetaldehyde dimethyl acetal, aminopropionaldehyde dimethyl acetal and aminobutyraldehyde dimethyl acetal, or, correspondingly, their cationic ammonium salts. The aldehydes containing amino and/or ammonium groups, or the hydrates, acetals and hemiacetals thereof, in accordance with the structural formulae I to IV, are used in mixtures with one or more unsubstituted aliphatic aldehydes, especially butyraldehyde or acetaldehyde, in order to give a modified polyvinyl acetal having amino and/or ammonium groups.

Suitable unsubstituted aliphatic aldehydes free from amino or ammonium groups are those from the group consisting of aliphatic aldehydes having 1 to 15 carbon atoms and their acetals and hemiacetals. Preference is given to formaldehyde, acetaldehyde, propionaldehyde and butyraldehyde. Particular preference is given to butyraldehyde or a mixture of butyraldehyde and acetaldehyde.

The polyvinyl butyrals modified with amino and/or ammonium groups have a nitrogen content (determined by the Kjeldahl method) of 0.001% to 5% by weight, preferably 0.005% to 2% by weight, more preferably 0.01% to 1% by weight and most preferably 0.02% to 0.9% by weight, based on the total weight of the polyvinyl acetal modified with amino and/or ammonium groups.

The degree of acetalization of the polyvinyl acetals modified with amino and/or ammonium groups is 1 mol % to 80 mol %, in the preferred ranges 1 mol % to 25 mol % and 40 mol % to 80 mol %. The amount of amino- and/or ammonium-acetal units relative to the total amount of acetal units is 0.001% to 95%, preferably 0.005% to 50%, more preferably 0.01% to 30%, based in each case on the total amount of acetal units in mol %. The viscosity of the modified polyvinyl acetals (DIN 53015; Höppler method, 10% strength solution in ethanol) is 4 mPas to 1200 mPas, preferably 4 to 120 mPas.

Aqueous suspensions of the polyvinyl acetals modified with amino and/or ammonium groups can be stabilized with anionic, zwitterionic, cationic and nonionic emulsifiers and also protective colloids. Preference is given to using zwitterionic or anionic emulsifiers, in mixtures where appropriate. Nonionic emulsifiers used are preferably condensation products of ethylene oxide or propylene oxide with linear or branched alcohols having 8 to 18 carbon atoms, alkylphenols or linear or branched carboxylic acids of 8 to 18 carbon atoms, and also block copolymers of ethylene oxide and propylene oxide. Examples of suitable anionic emulsifiers include alkyl sulphates, alkyl sulphonates, alkyl aryl sulphates, and also sulphates or phosphates of condensation products of ethylene oxide with linear or branched alkyl alcohols and with 2 to 25 EO units, alkylphenols, and monoesters or diesters of sulphosuccinic acid. Examples of suitable zwitterionic emulsifiers include alkyldimethylamine oxides, the alkyl chain possessing 6 to 16 carbon atoms. Examples of cationic emulsifiers which can be used include tetraalkylammonium halides, such as $C_6$-$C_{16}$-alkyltrimethylammonium bromide. It is also possible to use trialkylamines having one relatively long ($\geq 5$ carbon atoms) and two shorter hydrocarbon radicals (<5 carbon atoms), which in the course of the acetalization, which proceeds under strongly acidic conditions, may be present in protonated form and may act as an emulsifier. The amount of emulsifier is 0.01% to 20% by weight, based on the total weight of the modified polyvinyl acetal in the mother liquor. Preference is given to an amount of 0.01% to 2% by weight of emulsifier, more preferably an amount of 0.01% to 1% by weight of emulsifier, based on the modified polyvinyl acetal.

For the acetalization the fully or partly hydrolyzed polyvinyl esters are preferably taken up in an aqueous medium. Customarily a solids content of 5% to 30% is set in the aqueous solution. The acetalization takes place in the presence of acidic catalysts such as hydrochloric acid, sulphuric acid, nitric acid or phosphoric acid. The pH of the solution is adjusted to levels <1 preferably by addition of 20% strength hydrochloric acid.

Following the addition of the catalyst the solution is cooled to preferably −10° C. to +30° C. The rule here is as follows: the lower the molecular weight of the modified polyvinyl alcohol used, the lower the chosen precipitation temperature. The acetalization reaction is initiated by adding the aldehyde(s), use being made, besides aldehyde containing amino and/or ammonium groups, or the hydrate, acetal or hemiacetal thereof, of at least one unsubstituted aliphatic aldehyde. The amount for addition is governed by the desired degree of acetalization. Since the acetalization proceeds to virtually complete conversion, the amount for addition can be determined by means of simple stoichiometric calculation. Given that a mixture of aldehyde containing amino and/or ammonium groups and nitrogen-free aldehyde is employed, the proportion is a product of the target nitrogen content, the desired degree of acetalization, and the molecular weight of the aldehyde containing amino and/or ammonium groups.

When the addition of the aldehyde is at an end, the acetalization is completed by heating the batch to from 20° C. to 60° C. and stirring it for a number of hours, preferably 1 to 6 hours, and the pulverulent reaction product is isolated by filtration with a subsequent washing step. For stabilization it is possible, in addition, to add alkalis. Emulsifiers can be employed during the precipitation and the aftertreatment in order to stabilize the aqueous suspension of the polyvinyl acetal containing amino and/or ammonium groups.

In one particularly preferred process, first of all, one or more aldehydes containing amino and/or ammonium groups, and/or their hydrates, acetals or hemiacetals, are added, preferably at above the precipitation temperature, to the aqueous solution of the polyvinyl alcohol. Catalyst, hydrochloric acid for example, is used to set a pH of 0 to 5, so that the aldehydes containing amino and/or ammonium groups can pre-react with the polyvinyl alcohol. Subsequently the precipitation of the amino-modified polyvinyl acetal is effected at the precipitation temperature by adding one or more aldehydes not containing nitrogen. For the precipitation it is possible where appropriate to add further catalyst. This is followed by the work-up procedure described above.

The procedure according to the invention allows access to amino-modified polyvinyl acetals, preferably amino-modified polyvinyl butyrals, which possess much better adhesion to critical substrates than the polyvinyl acetals known to date, so that the addition of adhesion promoters can be dispensed with.

As mentioned at the beginning, it is in the printing ink industry in particular that there is need for binders possessing very good adhesion to flexible films of different polymers, in order to allow the provision of printing inks which, following application, are joined very firmly to the substrate and hence can be detached from the printed substrate only with very great difficulty. Because of the outstanding adhesion of the polyvinyl acetals modified with amino and/or ammonium groups, especially polyvinyl butyrals modified with amino and/or ammonium groups, the favourable interactions with pigments, and the advantageous (printing ink) rheology that also results as a consequence, they are particularly suitable for use in printing ink compositions.

Suitable printing ink formulations are known to the skilled person and generally include a pigment fraction of 5% to 25% by weight, made up of disazo or phthalocyanine pigments, for example, 5% to 25% by weight of polyvinyl acetal binder, and solvents, alcohols such as ethanol and esters such as ethyl acetate, for example. Where appropriate it is also possible for further additives to be included, such as retardants, plasticizers and other adjuvants, such as fillers or waxes, for example. Adhesion promoters are no longer vitally necessary.

Very great suitability, too, for laminated safety glass and glass laminates, high-performance safety glass or glazing films is possessed by the polyvinyl acetals modified with amino and/or ammonium groups, especially polyvinyl butyrals modified with amino and/or ammonium groups, since not only a further-improved adhesion to glass but also a higher tensile strength can be obtained. The use of other polymer films in these applications, such as PET films, is likewise advisable, since the polyvinyl butyrals modified with amino and/or ammonium groups, and the films produced from them, adhere very well not only to the glass surface but also to the surface of these other polymer films, so that the addition of adhesion promoters becomes superfluous.

Furthermore, water-soluble, partially acetalized polyvinyl acetals containing amino and/or ammonium groups, especially polyvinyl butyrals modified with amino and/or ammonium groups, serve as a protective colloid, for aqueous dispersions, for example, and for polymerization in an aqueous medium, and for the preparation of water-redispersible dispersion powders.

Preference is given here to polyvinyl butyrals which contain amino and/or ammonium groups, are soluble in water (solubility of more than 10 g/l in water under standard conditions) and have a degree of acetalization of 1 mol % to 40 mol %, in particular 3 mol % to 25 mol %.

The polyvinyl acetals modified with amino and/or ammonium groups, especially polyvinyl butyrals modified with amino and/or ammonium groups, can find use, furthermore, in coating materials on an aqueous basis or on the basis of organic solvents. As a result of the amino group functionalization the polyvinyl acetals of the invention are able via these groups to be crosslinked with suitable reagents which possess, for example, epoxide groups. This also opens up further fields of use, such as in powder coating materials.

Further fields of use of the polyvinyl acetals modified with amino and/or ammonium groups are as binders in anti-corrosion compositions, the improved adhesion being cited as an advantage. Additionally, the modified polyvinyl acetals are also suitable as binders in the ceramic industry, especially as binders for ceramic green bodies. Also appropriate to mention is their use as binders for ceramic powders and metal powders in powder injection moulding, and as binders for the interior coating of cans.

In all cases the polyvinyl acetals modified with amino and/or ammonium groups exhibit significantly better adhesion than the prior art polyvinyl acetals.

The examples which follow serve to illustrate the invention further without restricting it in any way whatsoever.

Example 1

A 6 liter glass reactor was charged with 2690 ml of distilled water and 1160 ml of a 20.2% strength aqueous solution of a fully hydrolyzed polyvinyl alcohol (viscosity 2.5 mPas (DIN 53015); Höppler method; 4% strength aqueous solution). The measured pH of this initial charge was 5.4. By addition of 10 ml of 20% strength hydrochloric acid a pH of 4.2 was set. The initial charge was then cooled to 10° C. with stirring and at this temperature 2.5 g of aminoacetaldehyde dimethyl acetal were added. The aminoacetaldehyde dimethyl acetal was pre-reacted with polyvinyl alcohol at 10° C. for 30 minutes, resulting in effective attachment. Subsequently the mixture was cooled to 2.7° C. and 1104 ml of 20% strength hydrochloric acid were added. Addition of the acid was observed to produce a smoke. The internal temperature rose to 8° C. After the mixture had been cooled further to −3.8° C., 151.1 g of butyraldehyde were added over a period of 5 minutes. During this time the internal reactor temperature rose to −1.2° C. Within a very short time it was cooled to −2° C. again. 3 minutes after the butyraldehyde had been added the batch, which was initially clear, became milky, and just 5 minutes later the product precipitated. After a reaction time of 40 minutes at −2° C. the temperature was raised to 25° C. over a period of 3.5 hours and this temperature was maintained for 2 hours more. Subsequently the product was isolated by filtration and washed with distilled water until the filtrate gave a neutral reaction. This was followed by drying to a solids content of at least 98%, initially at 22° C. and then at 35° C. in vacuo.

This gave a polyvinyl butyral modified with ammonium groups and containing 17.84% by weight of vinyl alcohol units. The vinyl acetate content was 1.71% by weight. The butyral content was 79.63% by weight and the acetal content, which carries ammonium groups, was 0.82% by weight. The nitrogen content (N content) was determined by the Kjeldahl method to be 0.084%. The viscosity (DIN 53015; Höppler method; 10% strength ethanolic solution) was 19.4 mPas.

Example 2

A 6 liter glass reactor was charged with 2690 ml of distilled water, 1114 ml of 20% strength HCl and 1160 ml of a 20.2% strength aqueous solution of a fully hydrolyzed polyvinyl alcohol (viscosity 2.5 mPas (DIN 53015); Höppler method; 4% strength aqueous solution). The initial charge was then cooled to 10° C. with stirring and then admixed with 5 g of aminoacetaldehyde dimethyl acetal. The addition of the aminoaldehyde acetal resulted in a smoke being given off. The aminoacetaldehyde dimethyl acetal was pre-reacted with polyvinyl alcohol at 10° C. for 30 minutes, resulting in effective attachment. After the mixture had been cooled to −4.2° C., 148.6 g of butyraldehyde were added over a period of 5 minutes. The internal reactor temperature rose to −1.7° C. during this addition. Within a very short time it was cooled to −2° C. again. 3 minutes after the addition of the butyraldehyde, clouding of the batch, which up to that point had been clear, was observed, and just 5 minutes later the product precipitated. After a reaction time of 40 minutes at −2° C. the temperature was raised to 25° C. over a period of 3.5 hours and this temperature was maintained for 2 hours more. Subsequently the product was isolated by filtration and washed with distilled water until the filtrate gave a neutral reaction. This was followed by drying to a solids content of at least 98%, initially at 22° C. and then at 35° C. in vacuo.

This gave a polyvinyl butyral modified with ammonium groups and containing 18.49% by weight of vinyl alcohol units. The vinyl acetate content was 1.73% by weight. The butyral content was 78.14% by weight and the acetal content, which carries ammonium groups, was 1.64% by weight. The nitrogen content (N content) was determined by the Kjeldahl method to be 0.171%. The viscosity (DIN 53015; Höppler method; 10% strength ethanolic solution) was 19.7 mPas.

Example 3

The procedure of Example 2 was repeated with the difference that the acetalization was carried out with 10 g of aminoacetaldehyde dimethyl acetal and 143.6 g of butyraldehyde.

This gave a polyvinyl butyral modified with ammonium groups and containing 18.42% by weight of vinyl alcohol units. The vinyl acetate content was 1.73% by weight. The butyral content was 76.52% by weight and the acetal content, which carries ammonium groups, was 3.33% by weight. The nitrogen content (N content) was determined by the Kjeldahl method to be 0.350%. The viscosity (DIN 53015; Höppler method; 10% strength ethanolic solution) was 19.1 mPas.

Example 4

The procedure of Example 2 was repeated with the difference that the acetalization was carried out with 20 g of aminoacetaldehyde dimethyl acetal and 133.6 g of butyraldehyde.

This gave a polyvinyl butyral modified with ammonium groups and containing 18.33% by weight of vinyl alcohol units. The vinyl acetate content was 1.73% by weight. The butyral content was 73.13% by weight and the amount of acetal with ammonium groups was 6.81% by weight. The nitrogen content (N content) was determined by the Kjeldahl method to be 0.704%. The viscosity (DIN 53015; Höppler method; 10% strength ethanolic solution) was 18.6 mPas.

Example 5

A 6 liter glass reactor was charged with 2617 ml of distilled water, 826 ml of 20% strength HCl and 1355 ml of a 20.0% strength aqueous solution of a fully hydrolyzed polyvinyl alcohol (viscosity 2.5 mPas (DIN 53015); Höppler method; 4% strength aqueous solution). This initial charge was cooled to 10° C. with stirring and then admixed with 5 g of aminoacetaldehyde dimethyl acetal (producing smoke). The aminoacetaldehyde dimethyl acetal was pre-reacted with the polyvinyl alcohol at 10° C. for 40 minutes, producing effective attachment.

After the mixture had been cooled further to the precipitation temperature of 5° C., 73.6 g of acetaldehyde were added over the course of 5 minutes. 20 minutes later, at an internal reactor temperature of 5° C., 103.5 g of butyraldehyde were added. After about 15 minutes the initially clear batch turned milky, and 20 minutes later the product precipitated. From this point on the temperature was retained for 40 minutes and then raised to 25° C. over a period of 3.5 hours. This temperature was held for a further 2 hours. Thereafter the product was isolated by filtration and washed with distilled water until the filtrate gave a neutral reaction. This was followed by drying to a solids content of at least 98%, initially at 22° C. and then at 35° C. in vacuo.

This gave a polyvinyl butyral modified with ammonium groups and containing 14.81% by weight of vinyl alcohol units. The vinyl acetate content was 1.75% by weight. The butyral content was 42.48% by weight, the acetacetal content was 39.68%, and the amount of acetal with ammonium groups was 1.28% by weight. The nitrogen content (N content) was determined by the Kjeldahl method to be 0.122%. The viscosity (DIN 53015; Höppler method; 10% strength ethanolic solution) was 20.5 mPas.

Example 6

The procedure of Example 5 was repeated with the difference that the acetalization was carried out with 10 g of aminoacetaldehyde dimethyl acetal, 68.2 g of acetaldehyde and 103.5 g of butyraldehyde.

This gave a polyvinyl butyral modified with ammonium groups and containing 17.34% by weight of vinyl alcohol units. The vinyl acetate content was 1.81% by weight. The butyral content was 42.00% by weight, the acetacetal content was 36.32% and the amount of acetal with ammonium groups was 2.53% by weight. The nitrogen content (N content) was determined by the Kjeldahl method to be 0.259%. The viscosity (DIN 53015; Höppler method; 10% strength ethanolic solution) was 20.4 mPas.

Example 7

The synthesis took place in the same way as for Example 2.

In the course of the work-up the modified pulverulent polyvinyl butyral from Example 2 was resuspended at 10% in water and the suspension was adjusted with NaOH to a pH of 12 and stirred at 30° C. for 10 h. This was followed by the further work-up, isolation and drying process as in Example 2.

This gave a polyvinyl butyral modified with amino groups and containing 18.49% by weight of vinyl alcohol units. The vinyl acetate content was 1.73% by weight. The butyral content was 78.14% by weight and the amount of acetal with amino groups was 1.64% by weight. The nitrogen content (N content) was determined by the Kjeldahl method to be 0.167%. The viscosity (DIN 53015; Höppler method; 10% strength ethanolic solution) was 19.8 mPas.

Example 8

The synthesis took place in the same way as for Example 3.

In the course of the work-up the modified pulverulent polyvinyl butyral from Example 3 was resuspended at 10% in water and the suspension was adjusted with NaOH to a pH of 12 and stirred at 30° C. for 24 h. This was followed by the further work-up, isolation and drying process as in Example 2.

This gave a polyvinyl butyral modified with amino groups and containing 18.42% by weight of vinyl alcohol units. The vinyl acetate content was 1.73% by weight. The butyral content was 76.52% by weight and the amount of acetal with amino groups was 3.33% by weight. The nitrogen content (N content) was determined by the Kjeldahl method to be 0.343%. The viscosity (DIN 53015; Höppler method; 10% strength ethanolic solution) was 19.2 mPas.

Comparative Example 9

A standard commercial polyvinyl butyral (BN 18) from Wacker Polymer Systems containing 80.0% by weight of vinyl butyral units, 2.0% by weight of vinyl acetate units and 18.0% by weight of vinyl alcohol units.

Determination Methods:

1. Determination of the Dynamic Viscosity of a Solution of Polyvinyl Butyrals (Solution Viscosity):

90.00±0.01 g of ethanol and 10.00±0.01 g of modified polyvinyl butyral were weighed out into a 250 ml conical flask with ground-glass stopper and complete dissolution was carried out at 50° C. in a shaker machine. The solution was subsequently cooled to 20° C. and the dynamic viscosity (DIN 53015; Höppler method) was determined at 20° C. using a suitable ball, e.g., ball 3.

2. Determination of the Vinyl Alcohol Content:

The amount of vinyl alcohol groups in the modified polyvinyl butyrals was determined—taking into account the amount of amino groups in the polymer (which was determined beforehand by method 3)—by acetylating the hydroxyl groups with acetic anhydride in the presence of pyridine and 4-dimethylaminopyridine.

For this purpose 1 g±0.001 g of polyvinyl acetal was dissolved in 24 ml of pyridine and 0.04 g of 4-dimethylaminopyridine at 50° C. over the course of 2 hours. After cooling to 25° C., the solution was admixed with 10 ml of a mixture of pyridine and acetic anhydride (87/13 parts by volume) and the resulting mixture was mixed intensively for 1 hour. Subsequently 30 ml of a mixture of pyridine/water (5/1 parts by volume) were added and the mixture was shaken for a further hour. It was subsequently titrated with methanolic 0.5 N KOH to a pH of 7.

Calculation:

% by weight vinyl alcohol=[(100×$M_w$)/2000]×(ml blank value−ml sample). Mw=average molecular weight per repeating unit of the polymer.

3. Determination of the Nitrogen Content (N Content):

The determination took place by the known method of Kjeldahl. The nitrogen content is reported in % by weight.

4. Determination of the Viscosity of the Polyvinyl Alcohol Solutions:

The viscosity of the partially or fully hydrolyzed solid resins used as reactants was determined in the same way as for the dynamic viscosity of the polyvinyl butyrals; only 4% strength aqueous solution to be used.

5. Performance Determination of the Adhesion:

Tesa Test:

A blister-free film of the sample under investigation (e.g. modified polyvinyl butyral) is drawn down onto a sheet (corona-pretreated where appropriate and cleaned where necessary with isopropanol beforehand) and dried. For this purpose the polyvinyl butyral is dissolved in ethanol, the concentration being guided in each case by the viscosity of the solution. For the test, Tesafilm 4105 adhesive tape from Beiersdorf AG with a width of 15 mm is used. In order to test the bond strength a strip approximately 13 cm long is applied to the dried sheet which has been stored at room temperature for at least 16 h. The applied strip is fixed by being rubbed in a standardized, uniform, forceful fashion with the finger, with one end of the Tesafilm being held in order to provide a removal tab. The sheet under test ought to be located on a hard substrate during this test. The Tesafilm is then pulled off rapidly at an angle of 45°, using the tab. The area tested is subsequently examined to determine whether and, if so, how much of the film has detached from the print substrate and is stuck to the Tesafilm. The test is carried out at a number of areas, under identical conditions. The result is rated on a scale from 1 to 4, where 1 is the best and 4 is the worst evaluation.

The Assessment in Detail:
1=very good adhesion (no detached areas)
2=the coating has detached at isolated areas
3=the coating has detached at a number of areas
4=no adhesion of the coating (completely detached)

Performance Results:

To investigate the adhesion the Tesa test was carried out using as OPP sheet Mobil MB 400 (polypropylene film sheet, corona pre-treatment at 600 W), which is known to be a critical substrate with regard to adhesion of polyvinyl butyral.

The results of the adhesion measurements on products from the examples and the comparative example are given in Table 1.

TABLE 1

| Ex. | Nitrogen content in % | Modification | Tesa test on OPP MB 400, corona-treated |
|---|---|---|---|
| 1 | 0.084 | Ammonium group | 2 |
| 2 | 0.171 | Ammonium group | 1 |
| 3 | 0.350 | Ammonium group | 1 |
| 4 | 0.704 | Ammonium group | 1 |
| 5 | 0.122 | Ammonium group | 1 |
| 6 | 0.259 | Ammonium group | 1 |
| 7 | 0.167 | Amino group | 1 |
| 8 | 0.343 | Amino group | 1 |
| C9 | 0.000 | None | 4 |

As is apparent from Table 1, conventional, non-modified polyvinyl butyrals exhibit only inadequate adhesion (Comparative Example 9) on this substrate, which is very critical with regard to adhesion. With even slight modification of the polyvinyl butyral with ammonium and/or amino groups, success is achieved in improving the adhesion markedly, and an excellent value can be obtained (Examples 1 to 8).

The invention claimed is:

1. In a printing ink composition comprising at least one pigment and a binder, the improvement comprising incorporating into the composition a binder comprising at least one polyvinyl acetal modified with amino or ammonium groups, prepared by acetalizing fully or partially hydrolyzed vinyl ester polymers containing $\geq$50 mol % of vinyl alcohol units in an aqueous medium with
   a) one or more aliphatic aldehydes having 1 to 15 carbon atoms, or an acetal, hemiacetal, or mixture thereof, and
   b) at least one aldehyde containing amino or ammonium group(s), or a hydrate, acetal, hemiacetal, or mixture thereof, wherein the degree of acetalization of the fully or partially hydrolyzed vinyl ester polymers with aliphatic aldehyde(s) is from 40 mol % to 80 mol %, and separating the polyvinyl acetal modified with amino or ammonium groups contained as a solid from the aqueous medium.

2. The printing ink composition of claim 1, wherein the at least one aldehyde containing amino or ammonium groups is selected from the group consisting of
   I) $(R)_2N-(CH_2)_n-CH(OR)_2$,
   II) $(R)_2N-(CH_2)_n-CH=O$,
   III) $X^-(R)_3N^+-(CH_2)_n-CH(OR)_2$, and
   IV) $X^-(R)_3N^+-(CH_2)_n-CH=O$,
   in each of which R is identical or different and is hydrogen or a branched or unbranched, saturated or unsaturated, alkyl radical having 1 to 12 carbon atoms, $X^-$ is an anion, and n is a number from 0 to 40.

3. The printing ink composition of claim 1, wherein the at least one aldehyde component containing amino or ammonium groups is selected from the group consisting of formamide, aminoacetaldehyde dimethyl acetal, aminoacetaldehyde diethyl acetal, aminopropionaldehyde dimethyl acetal, aminopropionaldehyde diethyl acetal, aminobutyraldehyde dimethyl acetal, aminobutyraldehyde diethyl acetal, and cationic ammonium salts thereof.

4. The printing ink composition of claim 1, wherein the aliphatic aldehyde comprises butyraldehyde or a mixture of butyraldehyde and acetaldehyde.

5. The printing ink composition of claim 1, wherein the aldehyde(s) containing amino or ammonium groups are used in an amount such that the amount of amino- and ammonium-containing acetal units, relative to the total amount of acetal units, is 0.001% to 95%, in mol %.

6. The printing ink composition of claim 1, wherein the nitrogen content of the polyvinyl acetal is from 0.001 to 5 weight percent based on the total weight of the polyvinyl acetal.

7. The printing ink composition of claim 1, wherein the nitrogen content of the polyvinyl acetal is from 0.01 to 1 weight percent based on the total weight of the polyvinyl acetal.

8. The printing ink composition of claim 1, wherein the nitrogen content of the polyvinyl acetal is from 0.02 to 0.9 weight percent based on the total weight of the polyvinyl acetal.

9. The printing ink composition of claim 1, wherein the polyvinyl acetal is prepared by acetalization of polyvinyl alcohol with butyraldehyde, acetaldehyde, their acetals, hemiacetals, or mixtures thereof, and at least one of aminoacetaldehyde dimethyl acetal, aminopropionaldehyde dimethyl acetal, aminobutyraldehyde dimethyl acetal, or their cationic ammonium salts.

10. The printing ink composition of claim 9, wherein the polyvinyl acetal modified with amino or ammonium groups has a nitrogen content in the range of 0.01 to 1 weight percent, based on the weight of the polyvinyl acetal modified with amino or ammonium groups.

11. The printing ink composition of claim 9, further comprising at least one organic solvent.

12. The printing ink composition of claim 11, wherein the at least one organic solvent is an alcohol or an alcohol ester.

13. The printing ink composition of claim 11, wherein the at least one solvent is ethyl acetate or ethanol.

14. The printing ink composition of claim 1, comprising 5 to 25 weight percent of one or more pigments based on the total weight of the printing ink composition.

15. The printing ink composition of claim 1, comprising 5 to 25 weight percent of binder based on the total weight of the printing ink composition.

16. The printing ink composition of claim 1, which is free of adhesion promoters.

17. The printing ink composition of claim 1, wherein the at least one aldehyde containing amino or ammonium groups is selected from the group consisting of I) $(R)_2N-(CH_2)_n-CH(OR)_2$,
II) $(R)_2N-(CH_2)_n-CH=O$,
in each of which R is identical or different and is hydrogen or a branched or unbranched, saturated or unsaturated, alkyl radical having 1 to 12 carbon atoms,
and n is a number from 0 to 40.

18. The printing ink composition of claim 1, wherein the at least one aldehyde containing amino or ammonium groups is selected from the group consisting of III) $X^-(R)_3N^+-(CH_2)-CH(OR)_2$, and
IV) $X^-(R)_3N^+-(CH_2)_n-CH=O$,
in each of which R is identical or different and is hydrogen or a branched or unbranched, saturated or unsaturated, alkyl radical having 1 to 12 carbon atoms,
$X^-$ is an anion, and n is a number from 0 to 40.

* * * * *